United States Patent
Takahashi et al.

(10) Patent No.: US 11,247,730 B2
(45) Date of Patent: Feb. 15, 2022

(54) VEHICLE BODY FRONT STRUCTURE

(71) Applicant: HONDA MOTOR CO., LTD., Tokyo (JP)

(72) Inventors: Yuki Takahashi, Wako (JP); Tomoki Yamaguchi, Wako (JP); Hirofumi Takemoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 16/839,103

(22) Filed: Apr. 3, 2020

(65) Prior Publication Data
US 2020/0339199 A1    Oct. 29, 2020

(30) Foreign Application Priority Data

Apr. 23, 2019    (JP) .............................. JP2019-082069

(51) Int. Cl.
| | |
|---|---|
| B62D 25/04 | (2006.01) |
| B60R 13/04 | (2006.01) |
| B62D 25/08 | (2006.01) |
| B60J 1/02 | (2006.01) |
| B60R 13/02 | (2006.01) |
| B60J 10/70 | (2016.01) |
| B60J 10/34 | (2016.01) |

(52) U.S. Cl.
CPC ................. *B62D 25/04* (2013.01); *B60J 1/02* (2013.01); *B60J 10/34* (2016.02); *B60J 10/70* (2016.02); *B60R 13/025* (2013.01); *B60R 13/04* (2013.01); *B62D 25/08* (2013.01)

(58) Field of Classification Search
CPC .......... B62D 25/04; B60R 13/04; B60R 13/06

USPC ........................................ 206/193.06, 96.18
See application file for complete search history.

(56) References Cited

U.S. PATENT DOCUMENTS 4,018,474 A * 4/1977 Kajio ..................... B62D 25/04
296/200

FOREIGN PATENT DOCUMENTS

| | | |
|---|---|---|
| JP | 62-072845 | 5/1987 |
| JP | 2001-071830 | 3/2001 |
| JP | 2003-276519 | 10/2003 |
| JP | 2005-125946 | 5/2005 |
| JP | 4244558 | 3/2009 |
| JP | 2017-056787 | 3/2017 |
| JP | 2018-184053 | 11/2018 |

OTHER PUBLICATIONS

Japanese Office Action for Japanese Patent Application No. 2019-082069 dated Jan. 12, 2021.

* cited by examiner

*Primary Examiner* — Dennis H Pedder
(74) *Attorney, Agent, or Firm* — Amin, Turocy & Watson, LLP

(57) ABSTRACT

A vehicle body front structure includes a front glass, a front pillar having a subsidiary glass provided at further outward in a vehicle width direction of a vehicle body than the front glass, a front pillar upper part provided between a roof and an upper member of the vehicle body and forming a load path of a front collision together with the upper member, and a stud provided in front of the front pillar upper part and configured to support an end portion of the front glass and an end portion of the subsidiary glass, and a garnish configured to cover the stud from an outer side of a passenger compartment.

7 Claims, 5 Drawing Sheets

VEHICLE BODY FRONT STRUCTURE

CROSS-REFERENCE TO RELATED APPLICATION

Priority is claimed on Japanese Patent Application No. 2019-082069, filed Apr. 23, 2019, the content of which is incorporated herein by reference.

BACKGROUND OF THE INVENTION

Field of the Invention

The present invention relates to a vehicle body front structure.

Description of Related Art

In the related art, various technologies in which a front pillar is provided between a front glass and a subsidiary glass of a vehicle and a field of vision of a driver is improved through reduction in size of the front pillar have been proposed.

For example, Japanese Unexamined Patent Application, First Publication No. 2005-125946 discloses a vehicle configuration in which an end portion of a front glass and an end portion of a delta window glass (a subsidiary glass) are adhered to flanges of both sides of a front pillar of the vehicle, respectively, and a garnish configured to cover the front pillar and both of the end portions from an outer side of a vehicle body is attached to the front pillar. According to the technology disclosed in Japanese Unexamined Patent Application, First Publication No. 2005-125946, a cross-sectional area of a front pillar having a hollow cross section can be reduced and a field of vision of a driver can be widened by fixing the garnish to the front pillar.

Japanese Patent No. 4244558 discloses a configuration of a front pillar including an integrated tubular member and a front pillar main body constituted by an outer panel member joined to a side surface of the tubular member on an outer side of the vehicle. According to the technology disclosed in Japanese Patent No. 4244558, since the front pillar main body is constituted by the integrated tubular member having a hollow cross section, the front pillar main body can be formed into an elongated shape while ensuring high rigidity.

SUMMARY OF THE INVENTION

However, in the technologies disclosed in Japanese Unexamined Patent Application, First Publication No. 2005-125946 and Japanese Patent No. 4244558, a hollow cross section is formed in a front pillar to increase the strength of the front pillar, and further reduction in size of the front pillar is limited. Accordingly, there is a problem in narrowing a width of the front pillar seen from a driver to improve a field of vision.

An aspect of the present invention is directed to providing a vehicle body front structure capable of further improving a field of vision of a driver.

(1) A vehicle body front structure according to the present invention includes a front glass; a front pillar having a subsidiary glass provided at further outward in a vehicle width direction of a vehicle body than the front glass, a front pillar upper part provided between a roof and an upper member of the vehicle body and forming a load path of a front collision together with the upper member, and a stud provided in front of the front pillar upper part and configured to support an end portion of the front glass and an end portion of the subsidiary glass; and a garnish configured to cover the stud from an outer side of a passenger compartment.

(2) In the aspect of the above-mentioned (1), an upper end portion of the stud may be attached to an upper section of the front pillar upper part, and a lower end portion of the stud may be attached to an extension section extending upward from the upper member provided below the front pillar upper part.

(3) In the aspect of the above-mentioned (2), at least the lower end portion of the stud may be pivoted with respect to the extension section by a fastening member.

(4) In the aspect of the above-mentioned (2) or (3), a cross rail connected to a lower end of the stud and extending in the vehicle width direction may be disposed on a lower end of the front pillar, and the extension section may bridge between the upper member and the cross rail.

(5) In the aspect of any one of the above-mentioned (1) to (4), the stud may be formed in a V-shaped cross section by a front support section to which the front glass is attached and a side support section disposed further outward in the vehicle width direction than the front support section and to which the subsidiary glass is attached, and at least one of the front support section and the side support section may have a garnish fixing part extending toward the garnish, and the garnish may be attached to the garnish fixing part.

(6) In the aspect of the above-mentioned (5), the garnish fixing part may be formed in an L shape by a joining section fixed to the front support section along the front support section and a connecting section extending from an end portion of the joining section toward the garnish.

(7) In the aspect of the above-mentioned (6), the connecting section may be provided on a bent section disposed between the front support section and the side support section.

(8) In the aspect of any one of the above-mentioned (5) to (7), a width dimension of the front support section and a width dimension of the side support section may be set to be equal to each other.

(9) In the aspect of any one of the above-mentioned (1) to (8), the garnish may include an inner part having an engaging section configured to engage with the stud; an outer part configured to cover the inner part and disposed at the outer side of the passenger compartment; an inner seal section in contact with the front glass; and an outer seal section in contact with the subsidiary glass.

(10) In the aspect of any one of the above-mentioned (1) to (9), an adhesive agent configured to fix the front glass and the subsidiary glass to the stud, and a seal member provided at a side in which the seal member is far from a central section of the stud than the adhesive agent in the vehicle width direction may be provided between the front glass and the subsidiary glass, and the stud.

(11) In the aspect of the above-mentioned (5) to (8), the stud may be formed by overlapping a plurality of plate members in a forward/rearward direction of the vehicle body, and the garnish fixing part may be fixed to the plate member at a front side, and a fixing bracket of an indoor garnish configured to cover at least the front pillar from an inner side of a passenger compartment may be fixed to the plate member at a rear side.

According to the aspect of the above-mentioned (1), since the front pillar has a stud disposed in front of the front pillar upper part and disposed between the front glass and the subsidiary glass, the front glass and the subsidiary glass can be supported by the stud. Here, when an impact load is input from the front of the vehicle body, an impact is transmitted to a roof as an impact load is transmitted to the front pillar upper part that forms a load path of a front collision together with the upper member. According to the configuration, since the stud is provided between the front glass and the subsidiary glass and the front pillar upper part is disposed behind the subsidiary glass, an impact load applied to the stud is minimized. Accordingly, in comparison with the related art in which the impact load is received by the front pillar by disposing the front pillar having the hollow cross section between the front glass and the subsidiary glass, a width of the stud when seen from a driver can be reduced. Accordingly, an area of an obstacle that interrupts a field of vision of a driver can be reduced, and the field of vision of the driver can be widened. In addition, since the garnish covers the stud from the outer side of the passenger compartment, a strength of the front pillar can be increased. Accordingly, the field of vision can be improved while the strength of the front pillar is maintained.

Accordingly, it is possible to provide the vehicle body front structure in which a field of vision of a driver is further improved.

According to the aspect of the above-mentioned (2), the lower end portion of the stud is attached to the extension section extending upward from the upper member. According to the configuration, for example, an impact load input from the front of the vehicle body is transmitted to the front pillar upper part via the upper member. Accordingly, since the impact load transmitted to the stud is minimized, a width of the stud when seen from a driver can be reduced. Accordingly, the field of vision of the driver can be further improved.

According to the aspect of the above-mentioned (3), since the lower end portion of the stud is pivoted with respect to the extension section, the stud and the extension section are rotatable with respect to each other at a fixed point of the lower end portion of the stud. Accordingly, for example, even when the upper member is retracted by the impact load input from the front of the vehicle body, the impact load transmitted to the stud can be minimized as the extension section is rotated rearward with respect to the stud. Accordingly, a width of the stud can be reduced, and the field of vision of the driver can be further improved.

According to the aspect of the above-mentioned (4), since the cross rail is disposed on the lower end of the front pillar, the lower end portion of the front glass can be supported by the cross rail. In addition, since the extension section bridges between the upper member and the cross rail, strength of the stud and the cross rail can be highly maintained by the extension section. Accordingly, the end portions of the front glass and the subsidiary glass can be strongly supported.

According to the aspect of the above-mentioned (5), since the stud is formed in a V-shaped cross section, the stud can be easily manufactured while the strength of the stud is increased and the width is reduced. Since at least one of the front support section and the side support section has the garnish fixing part, the garnish can be easily attached to the stud by attaching the garnish to the garnish fixing part.

According to the aspect of the above-mentioned (6), since the garnish fixing part is fixed to the front support section to which the front glass is attached, the front support section is reinforced by the garnish fixing part. Accordingly, the front support section can secure sufficient support strength with respect to the front glass having a larger weight than that of the subsidiary glass.

According to the aspect of the above-mentioned (7), the connecting section of the garnish fixing part to which the garnish is attached is provided on the bent section disposed between the front support section and the side support section. Accordingly, since the connecting section is provided on the bent section having higher strength than that of the front support section and the side support section, the garnish can be strongly supported.

According to the aspect of the above-mentioned (8), since the width dimension of the front support section and the width dimension of the side support section are set to be equal to each other, the width of the stud can be reduced, and the field of vision of the driver can be improved. In addition, since the width dimension of the entire stud is reduced, a strong separation vortex occurs in a wide range with respect to air from the front of the vehicle body, and wind noise can be reduced.

According to the aspect of the above-mentioned (9), since the garnish includes the inner part, the outer part, the inner seal section and the outer seal section, the inner part is formed of, for example, a resin material or the like having high rigidity to facilitate mounting on the stud, and the outer part is formed of, for example, a resin material or the like on which paint has good application properties, design properties can thus be improved. In addition, the inner seal section and the outer seal section may be formed of a material having good sealability to improve sealability. In this way, the garnish that can be manufactured by a simple method and having good functionality can be manufactured by selecting materials of the parts according to uses thereof.

According to the aspect of the above-mentioned (10), since the adhesive agent and the seal member are provided between the front glass and the subsidiary glass, and the stud, the front glass and the subsidiary glass can be fixed to the stud by an adhesive agent. Since the seal member is provided on a side in which the seal member is far from the central section of the stud than the adhesive agent, intrusion of the adhesive agent into the passenger compartment from the end portion of the stud during assembly can be minimized. In addition, the adhesive agent can be prevented from protruding along the glass surface. Accordingly, it is possible to provide the vehicle body front structure in which manufacturability and design properties are improved.

According to the aspect of the above-mentioned (11), since the stud is formed by overlapping the plurality of plate members in the forward/rearward direction, the strength of the stud can be increased by a simple method. In addition, for example, after the garnish fixing part is fixed to the plate member on the front side and the fixing bracket of the indoor garnish is fixed to the plate member on the rear side, the stud can be formed by overlapping and joining the plate members on the front and rear sides. Accordingly, the stud can be easily manufactured. Accordingly it is possible to provide a vehicle body front structure in which the strength of the stud is increased and manufacturability is improved.

DETAILED DESCRIPTION OF THE INVENTION

Figure 1:
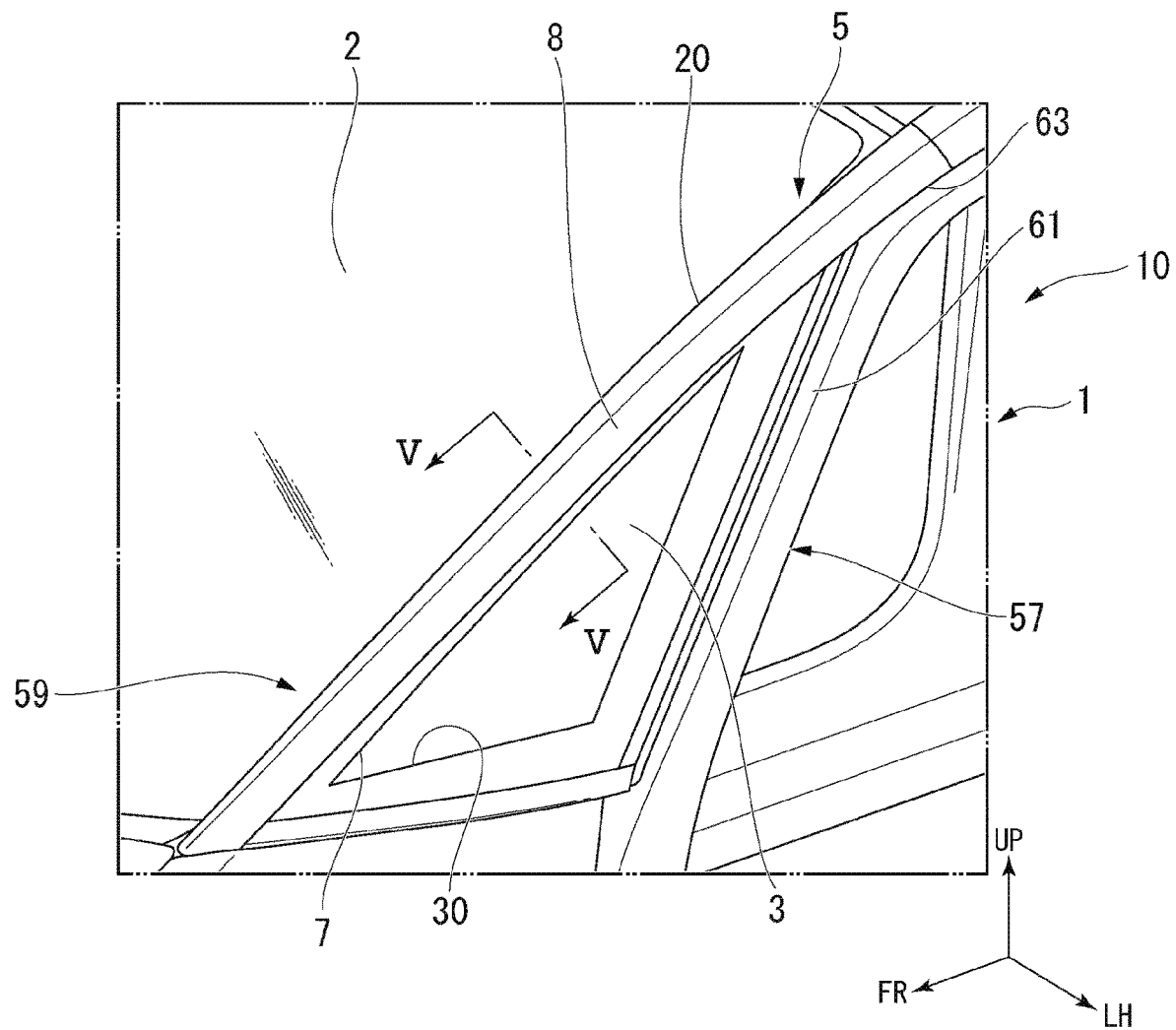
FIG. 1 is a perspective view of a vehicle body front structure according to an embodiment when seen from a front left side.

Hereinafter, an embodiment of the present invention will be described with reference to the accompanying drawings. In the drawings, an arrow FR indicates a forward direction with respect to a vehicle body, an arrow UP indicates an upward direction with respect to the vehicle body, and an arrow LH indicates a leftward direction with respect to the vehicle body. In addition, a vehicle width direction may be referred to as a leftward/rightward direction.

Embodiment (Vehicle Body Front Structure)

FIG. 1 is a perspective view of a vehicle body front structure 1 according to an embodiment when seen from a front left side.

The vehicle body front structure 1 is a structure disposed on a front side of a vehicle body 10. The vehicle body front structure 1 includes a front glass 2, subsidiary glasses 3, upper members 4 (see FIG. 2), and front pillars 5. The pair of subsidiary glasses 3, the pair of upper members 4 and the pair of front pillars 5 are provided on left and right sides.

The front glass 2 covers a front opening 20 provided in front of a cabin section of the vehicle body 10. The subsidiary glasses 3 are provided on both end portions of the front glass 2 in a vehicle width direction, and cover subsidiary openings 30 adjacent to the front opening 20 on both sides of the cabin section of the vehicle body 10. Each of the subsidiary glasses 3 is formed in a triangular shape.

Figure 2:
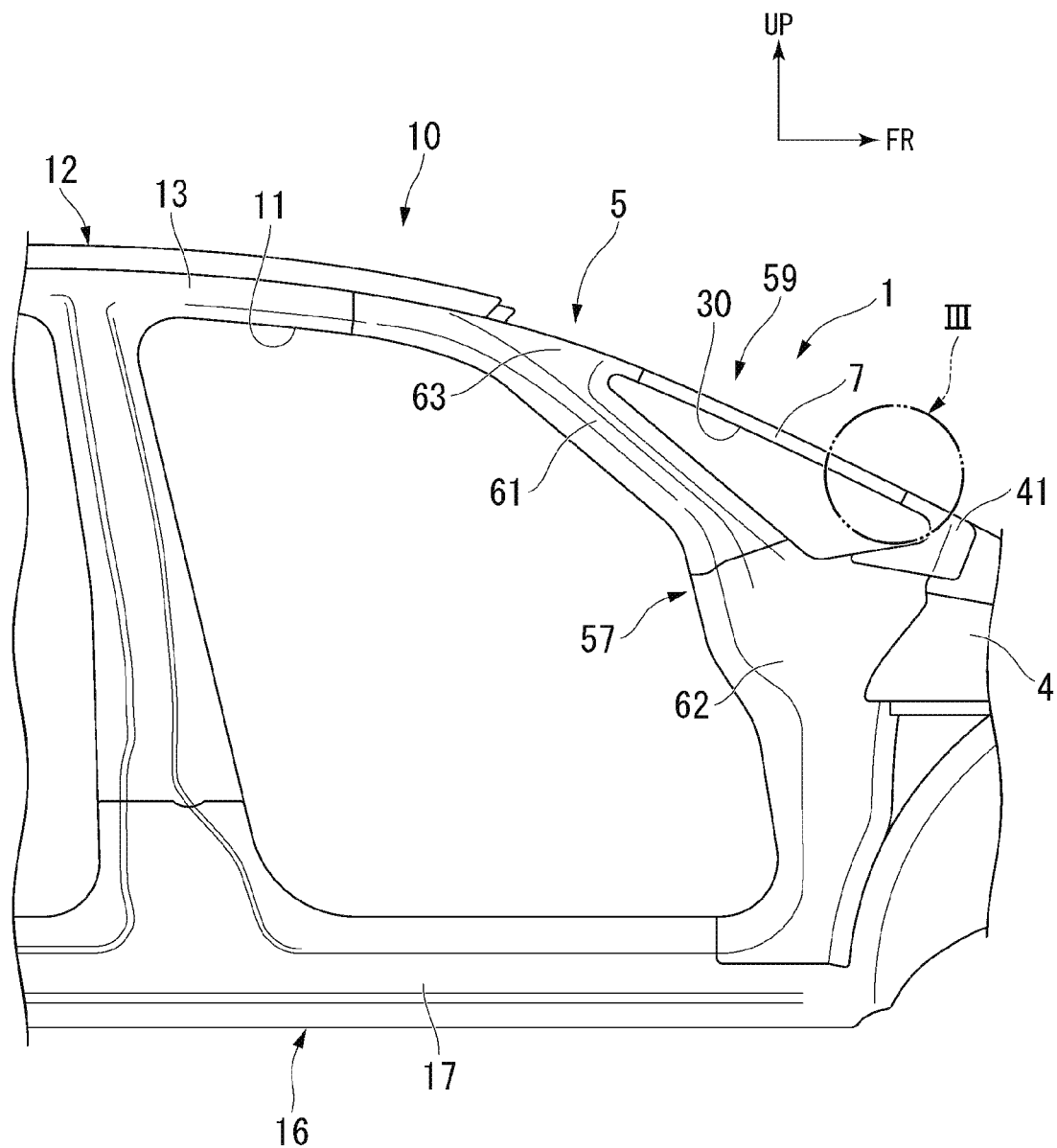
FIG. 2 is a side view of the vehicle body front structure according to the embodiment.

FIG. 2 is a side view of the vehicle body front structure 1 according to the embodiment.

The upper members 4 are provided in front of the subsidiary openings 30. The upper members 4 extend forward from front end portions of the subsidiary openings 30.

The front pillars 5 are disposed between a front door opening 11 of the vehicle body 10 and the upper members 4. Rear end portions of the front pillars 5 constitute a front portion of the front door opening 11. The subsidiary openings 30 are formed in upper sections of the front pillars 5. The front pillars 5 include main front pillars 57 and subsidiary front pillars 59.

The main front pillars 57 extend in an upward/downward direction to connect roof side rails 13 that constitute a roof 12 of the vehicle body 10 and side sills 17 that constitute a floor 16. The main front pillars 57 have front pillar upper parts 61 and front pillar lower parts 62.

The front pillar upper parts 61 are provided at upper section of the main front pillars 57, and upper end portions 63 are connected to a roof (not shown). The front pillar upper parts 61 constitute rear end portions of the subsidiary openings 30.

The front pillar lower parts 62 are provided at lower section of the main front pillars 57. Upper end portions of the front pillar lower parts 62 are connected to lower end portions of the front pillar upper parts 61. The upper end portions of the front pillar lower parts 62 constitute lower end portions of the subsidiary openings 30. The upper members 4 are connected to the front end portions of the front pillar lower parts 62.

The subsidiary front pillars 59 are provided in front of the main front pillars 57. The subsidiary front pillars 59 extend from the upper end portions 63 of the front pillar upper parts 61 toward the upper members 4. The subsidiary front pillars 59 are inclined downward from the rear toward the front. The subsidiary front pillars 59 constitute the upper end portions of the subsidiary openings 30. The subsidiary front pillars 59 include studs 7 and garnishes 8.

(Stud)

The studs 7 are provided in front of the front pillar upper parts 61. The studs 7 extend from the front pillar upper parts 61 toward the upper members 4. Specifically, the studs 7 are inclined downward from the rear toward the front. The upper end portions of the studs 7 are attached to the upper end portions 63 of the front pillar upper parts 61. The lower end portions of the studs 7 are attached to extension sections 41 extending upward from the upper members 4.

Figure 3:
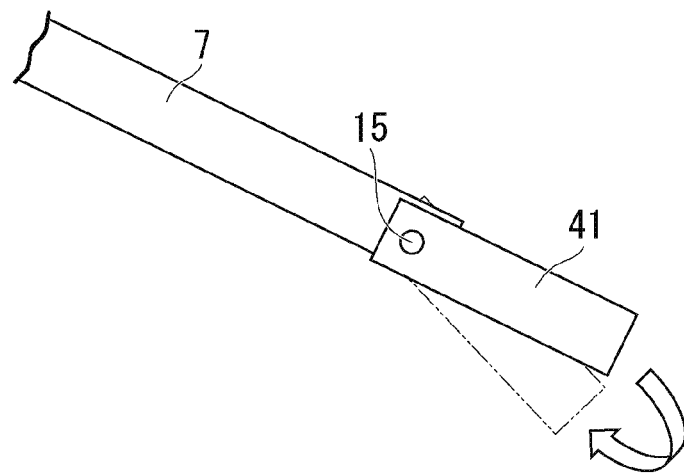
FIG. 3 is an enlarged view of a portion III in FIG. 2.

FIG. 3 is an enlarged view of a portion III in FIG. 2 showing the lower end portion of the stud 7. The lower end portions of the studs 7 are rotatably pivoted with respect to the extension sections 41 by fastening members 15 such as bolts or the like. Further, the studs 7 and the extension sections 41 may be rotatably attached to each other at a fixed point, or may be pivoted by, for example, riveting, caulking, or the like, in addition to bolts or the like. In addition, the upper end portions of the studs 7 may also be pivoted with respect to the upper end portions 63 of the front pillar upper parts 61.

Figure 4:
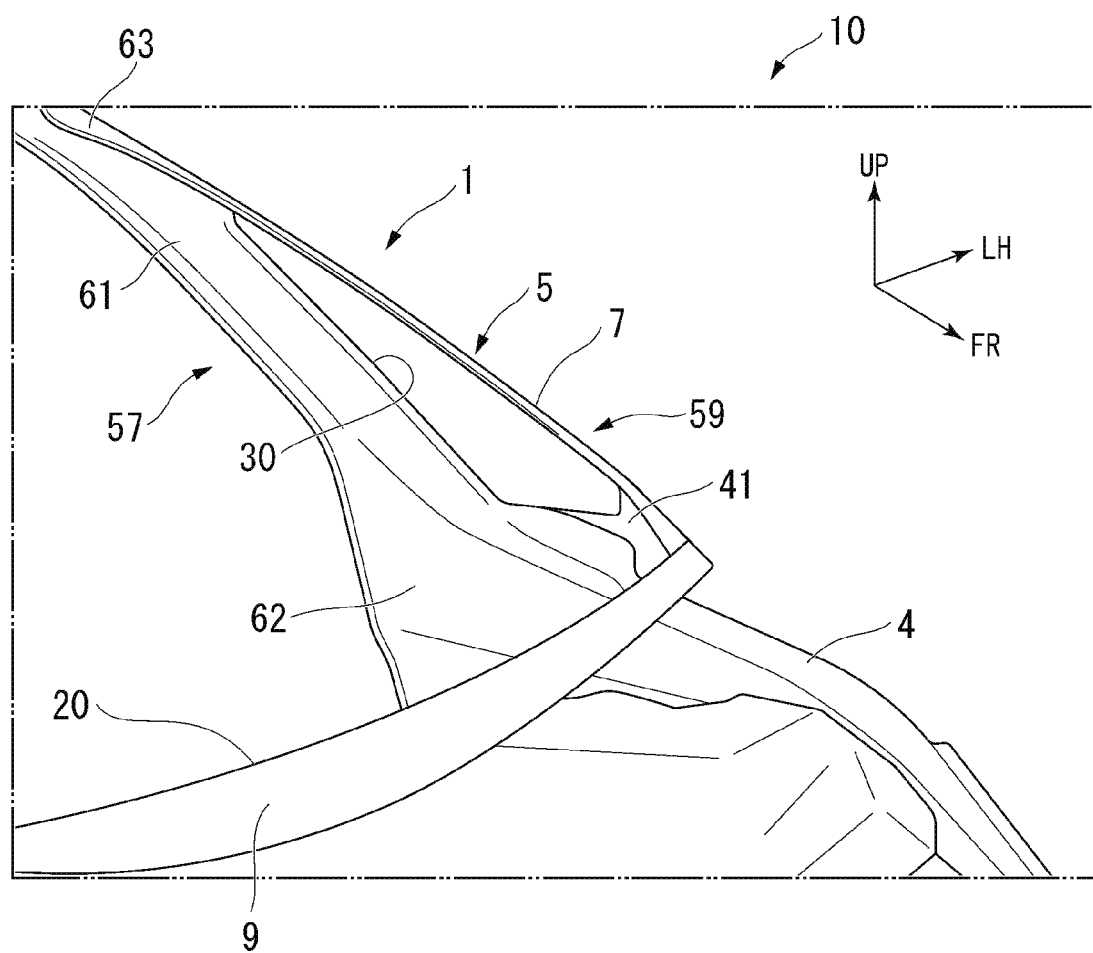
FIG. 4 is a perspective view of the vehicle body front structure according to the embodiment when seen from a front right side.

FIG. 4 is a perspective view of the vehicle body front structure 1 according to the embodiment when seen from a front right side.

A cross rail 9 extending in the vehicle width direction is disposed on the lower end portion of the studs 7. The cross rail 9 is supported by the upper members 4 via the extension sections 41. In other words, the extension sections 41 bridge between the upper members 4 and the cross rail 9.

Figure 5:
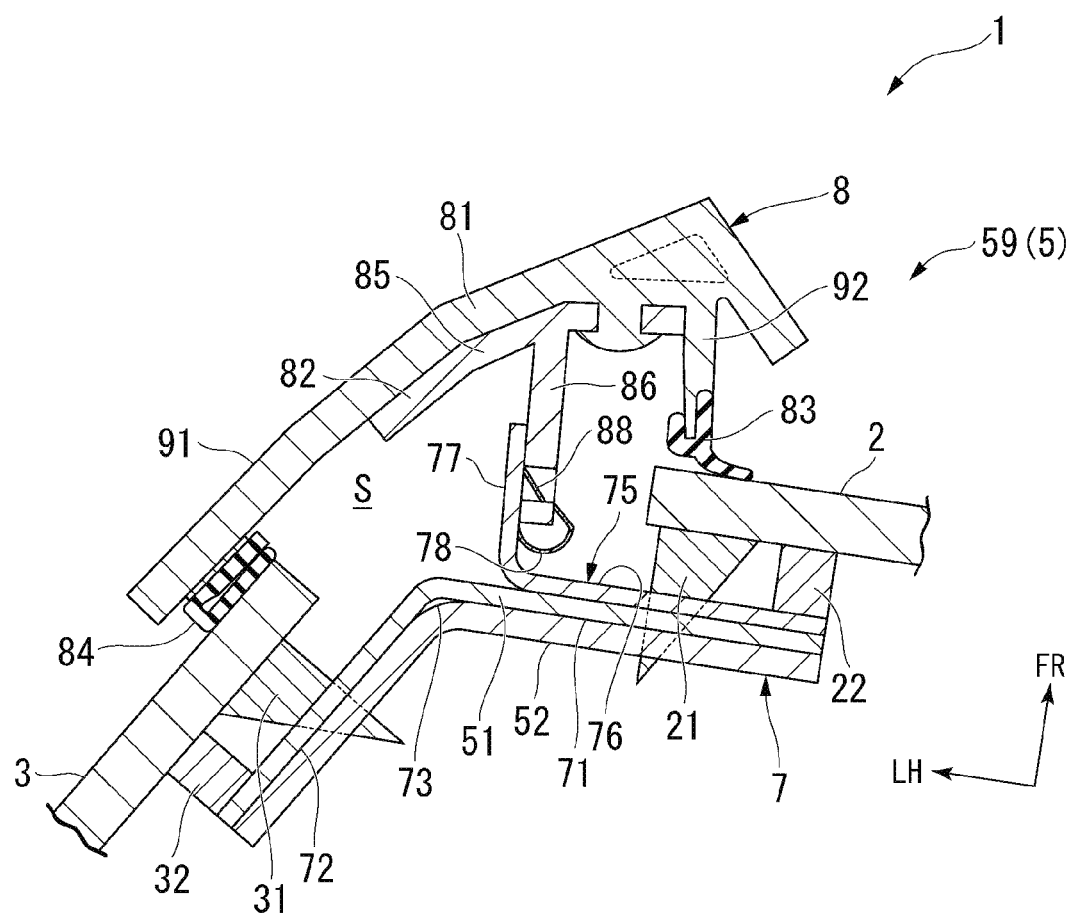
FIG. 5 is a cross-sectional view taken along line V-V in FIG. 1.

FIG. 5 is a cross-sectional view of the studs 7 and the garnishes 8 taken along line V-V in FIG. 1.

The studs 7 are formed in a V shape protruding outward from the passenger compartment when seen in a cross-sectional view (a cross-sectional view shown in FIG. 5) perpendicular to an extension direction of the studs 7. Specifically, the studs 7 are formed such that a first plate member 51 and a second plate member 52 having the same shape overlap each other in the forward/rearward direction. The front glass 2, the subsidiary glasses 3 and the garnishes 8 are fixed to the first plate member 51. Fixing brackets (none is shown) of an indoor garnish configured to cover the studs 7 from an inner side of the passenger compartment are fixed to the second plate member 52 disposed behind the first plate member 51. When seen in a cross-sectional view along line V-V, the studs 7 are formed in a V shape and have bent sections 73. Portions of the studs 7 located further inward in the vehicle width direction than the bent sections 73 are referred as front support sections 71, and portions located further outward in the vehicle width direction than the bent sections 73 are referred as side support sections 72. A width dimension of the front support sections 71 in the leftward/rightward direction and a width dimension of the side support sections 72 in the forward/rearward direction are set to be equal to each other.

The front glass 2 is attached to the front support sections 71. Specifically, the front glass 2 is fixed to the studs 7 by a front-side adhesive agent 21 provided between the front support sections 71 and the front glass 2. Front-side seal members 22, in addition to the front-side adhesive agent 21, are provided between the front support sections 71 and the front glass 2. The front-side seal members 22 are provided on a side in which the front-side seal members 22 are far from the bent sections 73 than the front-side adhesive agent 21.

The subsidiary glasses 3 are attached to the side support sections 72. Specifically, the subsidiary glasses 3 are fixed to the studs 7 by a subsidiary side adhesive agent 31 provided between the side support sections 72 and the subsidiary glasses 3. Subsidiary side seal members 32, in addition to the subsidiary side adhesive agent 31, are provided between the side support sections 72 and the subsidiary glasses 3. The subsidiary side seal members 32 are provided on a side in which the subsidiary side seal members 32 are far from the bent sections 73 than the subsidiary side adhesive agent 31.

A garnish fixing part 75 is attached to the front support section 71. The garnish fixing part 75 is formed in an L shape when seen in a cross-sectional view along line V-V by a joining section 76 fixed to the front support section 71 along the front support section 71 and a connecting section 77 extending from the end portion of the joining section 76 toward the garnish 8. The connecting section 77 is connected to an end portion of the joining section 76 on the side closer to the bent section 73. A clip section 78 is attached to a surface of the end portion of the connecting section 77 facing an inward side in the vehicle width direction. The clip section 78 is formed in a U shape that opens toward the garnish.

(Garnish)

The garnish 8 is formed in an elongated shape in the extension direction of the stud 7. The garnish 8 covers the stud 7 from the outside of the passenger compartment. The garnish 8 is attached to the stud 7 via the garnish fixing part 75 provided on the front support section 71. The garnish 8 has an outer part 81, an inner part 82, an inner seal section 83 and an outer seal section 84.

The outer part 81 is disposed on the outermost side of the passenger compartment. The outer part 81 has a design surface 91 facing an outer side of the passenger compartment, and an inner seal attachment leg section 92. The outer part 81 is formed of, for example, a resin material or the like on which paint has good application properties. The outer part 81 covers a gap S between the end portions of the front glass 2 and the subsidiary glass 3 from the outer side of the passenger compartment.

The inner seal attachment leg section 92 protrudes from the surface of the outer part 81 facing the inner side of the passenger compartment toward the front glass 2. The inner seal attachment leg section 92 is provided further inward in the vehicle width direction than the connecting section 77.

The inner part 82 is connected to the surface of the outer part 81 facing the inner side of the passenger compartment. The inner part 82 is formed of, for example, a resin material or the like having a higher rigidity than that of the outer part 81. The inner part 82 has an extending section 85 and a protrusion section 86.

The extending section 85 extends along the surface of the outer part 81 facing the inside of the passenger compartment. The extending section 85 is fixed to the outer part 81.

The protrusion section 86 protrudes from the extending section 85 toward the inside of the passenger compartment. Specifically, the protrusion section 86 protrudes toward the connecting section 77 of the garnish fixing part 75. An engaging section 88 is provided on a tip of the protrusion section 86. In the embodiment, the engaging section 88 is formed in a claw shape. The engaging section 88 can be engaged with the clip section 78 provided on the stud 7. When the engaging section 88 is engaged with the clip section 78, the garnish 8 is attached to the stud 7.

The inner seal section 83 is attached to a tip of the inner seal attachment leg section 92 of the outer part 81. The inner seal section 83 is in contact with the front glass 2. A space between the front glass 2 and the garnish 8 is sealed by the inner seal section 83.

The outer seal section 84 is attached to a surface of the outer part 81 facing the inner side of the passenger compartment at outer side in the vehicle width direction than the protrusion section 86. The outer seal section 84 is in contact with the subsidiary glass 3. A space between the subsidiary glass 3 and the garnish 8 is sealed by the outer seal section 84.

Figure 6:
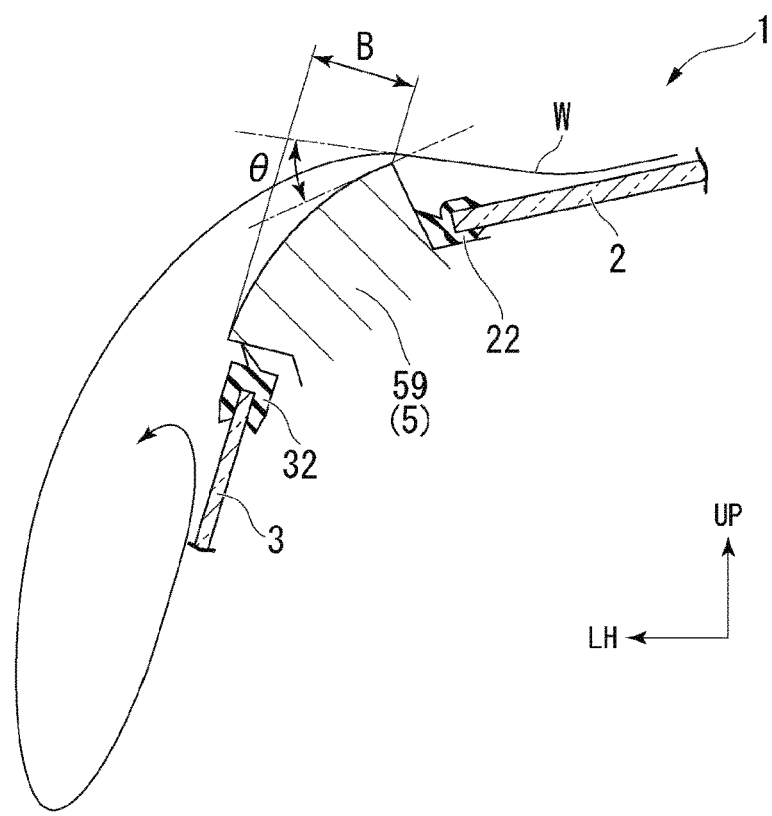
FIG. 6 is a schematic view showing a flow of a fluid around the vehicle body front structure according to the embodiment.
Figure 7:
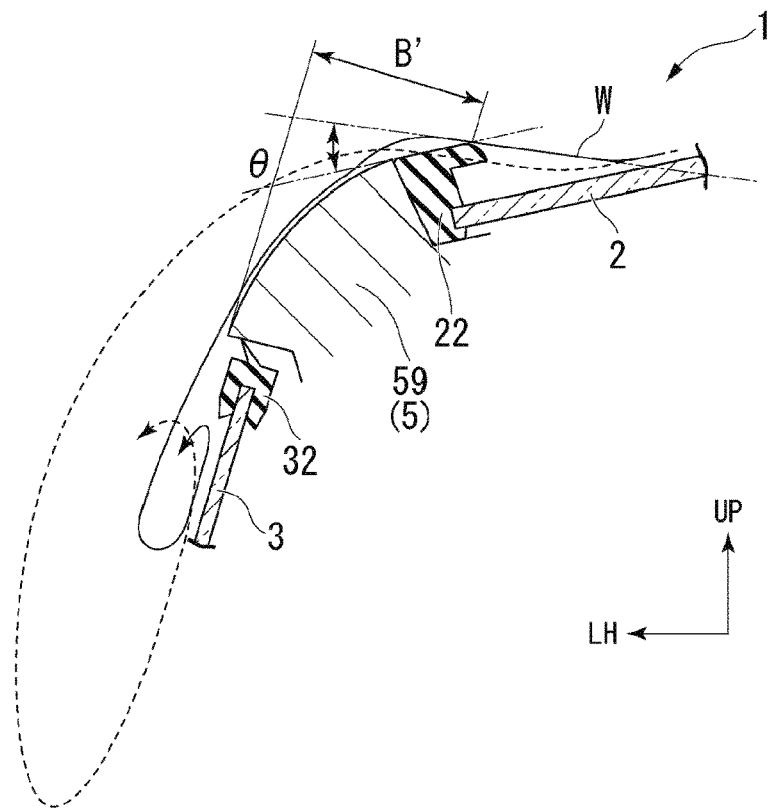
FIG. 7 is a schematic view showing a flow of a fluid around a vehicle body front structure according to the related art.

FIG. 6 is a schematic view showing a flow of a fluid around the vehicle body front structure 1 according to the embodiment. FIG. 7 is a schematic view showing a flow of a fluid around the vehicle body front structure 1 according to the related art.

As shown in FIG. 6, the vehicle body front structure 1 of the embodiment has a pillar width B when seen in the forward/rearward direction that is smaller than a pillar width B' (see FIG. 7) in the related art in a corner section between the front glass 2 and the subsidiary glass 3. In addition, an inclination angle θ of the front pillar 5 with respect to a stream direction of a wind W input from the front of the vehicle body 10 is greater than an inclination angle θ' (see FIG. 7) in the related art. Accordingly, a strong separation vortex occurs around the front pillar 5 throughout a wider range than in the related art. Accordingly, an increase in wind noise generated due to the wind input into the vehicle body 10 is minimized, and sound insulating properties of the vehicle body 10 are improved in comparison with the related art.

(Actions and Effects)

Next, actions and effects of the vehicle body front structure 1 will be described.

According to the vehicle body front structure 1 of the embodiment, since the front pillar 5 is disposed in front of the front pillar upper part 61 and has the stud 7 disposed between the front glass 2 and the subsidiary glass 3, the front glass 2 and the subsidiary glass 3 can be supported by the stud 7. Here, when an impact load is input from the front of the vehicle body 10, an impact is transmitted to the roof 12 as an impact load is transmitted to the front pillar upper part 61 that forms a load path of a front collision together with the upper member 4. According to the configuration, since the stud 7 is provided between the front glass 2 and the subsidiary glass 3 and the front pillar upper part 61 is disposed behind the subsidiary glass 3, an impact load applied to the stud 7 is minimized. Accordingly, in comparison with the related art in which the impact load is received by the front pillar 5 by disposing the front pillar 5 having the hollow cross section between the front glass 2 and the subsidiary glass 3, a width of the stud 7 when seen from a driver can be reduced. Accordingly, an area of an obstacle that interrupts a field of vision of the driver can be reduced, and the field of vision of the driver can be widened. In addition, since the garnish 8 covers the stud 7 from the outside of the passenger compartment, strength of the stud 7 can be increased. Accordingly, the field of vision can be improved while maintaining strength of the front pillar 5.

Accordingly, it is possible to provide the vehicle body front structure 1 in which the field of vision of the driver is further improved.

The lower end portion of the stud 7 is attached to the extension section 41 extending upward from the upper member 4. According to the configuration, for example, an impact load input from the front of the vehicle body 10 is transmitted to the front pillar upper part 61 via the upper member 4. Accordingly, since the impact load transmitted to the stud 7 is minimized, a width of the stud 7 when seen from the driver can be reduced. Accordingly, the field of vision of the driver can be further improved.

Since the lower end portion of the stud 7 is pivoted with respect to the extension section 41, the stud 7 and the extension section 41 are rotatable with respect to each other at a fixed point of the lower end portion of the stud 7. Accordingly, for example, even when the upper member 4 is retracted by the impact load input from the front of the vehicle body 10, the impact load transmitted to the stud 7 can be minimized as the extension section 41 is rotated rearward with respect to the stud 7. Accordingly, the width of the stud 7 can be reduced, and the field of vision of the driver can be further improved.

Since the cross rail 9 is disposed on the lower end of the front pillar 5, the lower end portion of the front glass 2 can be supported by the cross rail 9. In addition, since the extension section 41 bridges between the upper member 4 and the cross rail 9, strength of the stud 7 and the cross rail 9 can be highly maintained by the extension section 41. Accordingly, the end portions of the front glass 2 and the subsidiary glass 3 can be strongly supported.

Since the stud 7 is formed in a V-shaped cross section, the stud 7 can be easily manufactured while increasing strength of the stud 7 and reducing the width. Since the front support section 71 has the garnish fixing part 75, the garnish 8 can be easily attached to the stud 7 by attaching the garnish 8 to the garnish fixing part 75.

Since the garnish fixing part 75 is fixed to the front support section 71 to which the front glass 2 is attached, the front support section 71 is reinforced by the garnish fixing part 75. Accordingly, the front support section 71 can secure sufficient support strength with respect to the front glass 2 having a weight greater than that of the subsidiary glass 3.

The connecting section 77 of the garnish fixing part 75 to which the garnish 8 is attached is provided on the bent section 73 between the front support section 71 and the side support section 72. Accordingly, since the connecting section 77 is provided in the bent section 73 having strength higher than that of the front support section 71 and the side support section 72, the garnish 8 can be strongly supported.

Since the width dimension of the front support section 71 is the same as the width dimension of the side support section 72, the width of the stud 7 can be reduced, and the field of vision of the driver can be improved. In addition, since the width dimension of the entire the stud 7 is reduced, a strong separation vortex occurs in a wide range with respect to the wind from the front of the vehicle body 10, and wind noise can be reduced.

Since the garnish 8 includes the outer part 81, the inner part 82, the inner seal section 83 and the outer seal section 84, the inner part 82 may be formed of, for example, a resin material or the like having high rigidity to facilitate mounting on the stud 7, and the outer part 81 may be formed of, for example, a resin material or the like on which paint has good application properties to improve a design property. In addition, the inner seal section 83 and the outer seal section 84 may be formed of a material having good sealability to improve sealability. In this way, since materials of the parts are selected according to uses thereof, it is possible to manufacture the garnish 8 that can be manufactured by a simple method and has good functionality.

Since the adhesive agents 21 and 31 and the seal members 22 and 32 are provided between the front glass 2 and the subsidiary glasses 3 and the studs 7, the front glass 2 and the subsidiary glasses 3 can be fixed to the studs 7 by the adhesive agents 21 and 31. Since the seal members 22 and 32 are provided on a side in which the seal members 22 and 32 are far from the central sections of the studs 7 than the adhesive agents 21 and 31, intrusion of the adhesive agents 21 and 31 into the passenger compartment from the end portions of the studs 7 during assembly can be minimized. In addition, the adhesive agents 21 and 31 can be prevented from protruding along the glass surface. Accordingly, the vehicle body front structure 1 with improved manufacturability and design property can be obtained.

Since the studs 7 are formed by overlapping a plurality of plate members 51 and 52 in the forward/rearward direction, strength of the studs 7 can be increased by a simple method. In addition, for example, after the garnish fixing part 75 is fixed to the plate member (the first plate member 51) on the front side and the fixing bracket of the indoor garnish is fixed to the plate member (the second plate member 52) on the rear side, the studs 7 can be formed by overlapping and joining the plate members 51 and 52 on the front and rear sides. Accordingly, the studs 7 can be easily manufactured. Accordingly, strength of the studs 7 can be increased, and the vehicle body front structure 1 with improved manufacturability can be obtained.

Further, the technical scope of the present invention is not limited to the above-mentioned embodiment, and various modifications may be made without departing from the scope of the present invention.

For example, in the embodiment, while the studs 7 are formed as the first plate member 51 and the second plate member 52 overlap each other, the number of overlapping plate members is not limited to two. The studs 7 may be formed by overlapping the plurality of (three or more) plate members.

The engaging section 88 may be configured to be engaged with the connecting section 77 by forming a convex section on the engaging section 88, forming a concave section such as a hole or the like in the connecting section 77 and fitting the convex section into the hole of the connecting section 77.

While the outer seal section 84 is attached to the outer part 81, the outer seal section 84 may be attached to the inner part 82.

The outer part 81 and the inner part 82 of the garnish 8 may be formed of a material other than a resin material.

The garnish fixing part 75 may be fixed to the side support sections 72.

The vehicle body 10 may be a vehicle body of an engine vehicle on which an engine is mounted, or may be a vehicle body of an electric automobile, a hybrid automobile, or the like, on which a motor is mounted.

While preferred embodiments of the invention have been described and illustrated above, it should be understood that these are exemplary of the invention and are not to be considered as limiting. Additions, omissions, substitutions, and other modifications can be made without departing from the s scope of the present invention. Accordingly, the invention is not to be considered as being limited by the foregoing description, and is only limited by the scope of the appended claims.

What is claimed is:

1. A vehicle body front structure comprising:
    a front glass;

a front pillar having a subsidiary glass provided at further outward in a vehicle width direction of a vehicle body than the front glass, a front pillar upper part provided between a roof and an upper member of the vehicle body and forming a load path of a front collision together with the upper member, and a stud provided in front of the front pillar upper part and configured to support an end portion of the front glass and an end portion of the subsidiary glass; and a garnish configured to cover the stud from an outer side of a passenger compartment, wherein the stud is formed in a plate form which protrudes outward from the passenger compartment with a front support section to which the front glass is attached and a side support section disposed further outward in the vehicle width direction than the front support section and to which the subsidiary glass is attached, wherein the stud is formed such that a first plate member and a second plate member overlap each other in a forward/rearward direction of the vehicle body, wherein the first plate member and the second plate member are formed so as to have same plate shape with each other, wherein a garnish fixing part, which extends toward the garnish, is fixed to the first plate member disposed at front side of the second plate member, wherein the garnish fixing part is formed in an L shape by a joining section which is fixed to the front support section along the front support section of the first plate member and a connecting section which is extending toward the garnish from an end portion of the joining section located at an outer side in the vehicle width direction closer to a center of the stud, wherein a clip section is attached to a surface of the end portion of the connecting section facing an inward side in the vehicle width direction, and wherein the garnish is attached to the stud when an engaging section, which is provided on a tip of a protrusion section of the garnish protruding toward the connecting section of the garnish fixing part, is engaged with the clip section.

2. The vehicle body front structure according to claim 1, wherein an upper end portion of the stud is attached to an upper section of the front pillar upper part, and a lower end portion of the stud is attached to an extension section extending upward from the upper member provided below the front pillar upper part.

3. The vehicle body front structure according to claim 2, wherein at least the lower end portion of the stud is pivoted with respect to the extension section by a fastening member.

4. The vehicle body front structure according to claim 2, wherein a cross rail connected to a lower end of the stud and extending in the vehicle width direction is disposed on a lower end of the front pillar, and the extension section bridges between the upper member and the cross rail.

5. The vehicle body front structure according to claim 1, wherein a width dimension of the front support section and a width dimension of the side support section are set to be equal to each other.

6. The vehicle body front structure according to claim 1, wherein the garnish comprises:

an inner part having the engaging section configured to engage with the stud;

an outer part configured to cover the inner part and disposed at the outer side of the passenger compartment;

an inner seal section in contact with the front glass; and an outer seal section in contact with the subsidiary glass.

7. The vehicle body front structure according to claim 1, wherein an adhesive agent configured to fix the front glass and the subsidiary glass to the stud, and a seal member provided at a side in which the seal member is far from a central section of the stud than the adhesive agent in the vehicle width direction are provided between the front glass and the subsidiary glass, and the stud.

* * * * *